United States Patent
Liu et al.

(10) Patent No.: US 12,430,568 B2
(45) Date of Patent: Sep. 30, 2025

(54) DECOUPLED ARCHITECTURE FOR ARTIFICIAL INTELLIGENCE MODEL MANAGEMENT

(71) Applicant: EMC IP Holding Company LLC, Hopkinton, MA (US)

(72) Inventors: Jinpeng Liu, Shanghai (CN); Jin Li, Shanghai (CN); Zhen Jia, Shanghai (CN); Christopher S. MacLellan, Uxbridge, MA (US)

(73) Assignee: Dell Products L.P., Round Rock, TX (US)

( * ) Notice: Subject to any disclaimer, the term of this patent is extended or adjusted under 35 U.S.C. 154(b) by 1377 days.

(21) Appl. No.: 17/029,769

(22) Filed: Sep. 23, 2020

(65) Prior Publication Data
US 2022/0092439 A1    Mar. 24, 2022

(51) Int. Cl.
*G06N 5/02* (2023.01)
*G06N 5/04* (2023.01)

(52) U.S. Cl.
CPC ............. *G06N 5/02* (2013.01); *G06N 5/04* (2013.01)

(58) Field of Classification Search
CPC ... G06N 5/02; G06N 5/04; G06N 3/08; G06F 8/35; G06F 9/44521
See application file for complete search history.

(56) References Cited

U.S. PATENT DOCUMENTS

| | | | |
|---|---|---|---|
| 10,698,737 B2 * | 6/2020 | Fachini | G06N 3/063 |
| 11,159,628 B1 * | 10/2021 | Gupta | G06N 20/00 |
| 11,301,762 B1 * | 4/2022 | Chen | G06N 5/027 |
| 2019/0324810 A1 | 10/2019 | Zhao et al. | |
| 2022/0172044 A1 * | 6/2022 | Liu | G06N 3/04 |

OTHER PUBLICATIONS

Wikipedia, "Intermediate Representation," https://en.wikipedia.org/w/index.php?title=Intermediate_representation&direction=next&oldid=905361000, Jan. 24, 2020, 4 pages.
Jia et al., "Beyond Data and Model Parallelism for Deep Neural Networks," Proceedings of the 2nd SysML Conference, Palo Alto, CA, Jul. 2018, 13 pages.
Wikipedia, "Deep Learning," https://en.wikipedia.org/wiki/Deep_learning, Feb. 6, 2020, 33 pages.
Wikipedia, "Everything as a Service," https://simple.wikipedia.org/wiki/Everything_as_a_service, Aug. 23, 2019, 2 pages.
L. Song et al., "HyPar: Towards Hybrid Parallelism for Deep Learning Accelerator Array," arXiv:1901.02067v1, Jan. 7, 2019, 13 pages.
(Continued)

*Primary Examiner* — Xiao En Mo
(74) *Attorney, Agent, or Firm* — Ryan, Mason & Lewis, LLP

(57) ABSTRACT

A decoupled artificial intelligence model management architecture comprises a front-end component, a scheduler component and a back-end component configured to enable an open and dynamic system which accepts any models from any formats to be deployed on any target devices and to dynamically change scheduling of parallelism, parameter movements and computation executions across the target devices.

20 Claims, 4 Drawing Sheets

(56) References Cited

OTHER PUBLICATIONS

Github, "OpenNess Architecture and Solution Overview," https://github.com/open-ness/specs/blob/master/doc/architecture.md, accessed Jul. 7, 2020, 15 pages.
Amazon Web Services, "Machine Learning Inference with AWS IoT Greengrass Solution Accelerator" https://aws.amazon.com/iot/solutions/mli-accelerator/, Oct. 2019, 5 pages.
Y. Huang et al., "GPipe: Efficient Training of Giant Neural Networks using Pipeline Parallelism," arXiv:1811.06965v5 [cs.CV], Jul. 25, 2019, 11 pages.
D. Narayanan et al., "PipeDream: Generalized Pipeline Parallelism for DNN Training," The 27th ACM Symposium on Operating Systems Principles, Huntsville, Ontario, Canada, Oct. 27-30, 2019, 15 pages.
LLVM, "The LLVM Compiler Infrastructure," https://llvm.org/, Accessed Jul. 10, 2020, 3 pages.
LLLV, "Multi-Level Intermediate Representation Overview," https://mlir.llvm.org/, Accessed Jul. 10, 2020, 3 pages.
ONNX, "Open Neural Network Exchange," https://onnx.ai/, 2019, 3 pages.
Github, "ONNX: Open Standard for Machine Learning Interoperability," https://github.com/onnx/onnx, Accessed Jul. 10, 2020, 8 pages.
Github, "ONNX: Operators.md at Master," https://github.com/onnx/onnx/blob/master/docs/Operators.md, Accessed Jul. 10, 2020, 233 pages.
Github, "ONNX Runtime: Cross-Platform, High Performance ML Inferencing and Training Accelerator," https://github.com/microsoft/onnxruntime, Accessed Jul. 10, 2020, 10 pages.
Github, "LLVM Project: MLIR at Master," https://github.com/llvm/llvm-project/tree/master/mlir, Accessed Jul. 10, 2020, 2 pages.
U.S. Appl. No. 16/540,385 filed in the name of Jinpeng Liu et al. on Aug. 14, 2019, and entitled "Method, a Device and a Computer Program Product for Determining a Resource Required for Executing a Code Segment."
U.S. Appl. No. 16/542,757 filed in the name of Jinpeng Liu et al. on Aug. 16, 2019, and entitled "Method, Device and Computer Program Product for Processing Machine Learning Model."
U.S. Appl. No. 16/678,758 filed in the name of Jinpeng Liu et al. on Nov. 8, 2019, and entitled "Method, Electronic Device and Computer Program Product for Processing Machine Learning Model."
U.S. Appl. No. 16/789,006 filed in the name of Jin Li et al. on Feb. 12, 2020, and entitled "Scheduling Artificial Intelligence Model Partitions Based on Reversed Computation Graph."
U.S. Appl. No. 16/823,445 filed in the name of Jinpeng Liu et al. on Mar. 19, 2020, and entitled "Task Scheduling Method, Electronic Device, and Computer Storage Medium."
U.S. Appl. No. 16/845,682 filed in the name of Jin Li et al. on Apr. 10, 2020, and entitled "Task Processing Method, Electronic Device, and Computer Program Product."
U.S. Appl. No. 16/925,864 filed in the name of Jinpeng Liu et al. on Jul. 10, 2020, and entitled "Managing Artificial Intelligence Model Partitions for Edge Computing Environment."

\* cited by examiner

300

DECOUPLED ARCHITECTURE FOR ARTIFICIAL INTELLIGENCE MODEL MANAGEMENT

FIELD

The field relates generally to information processing systems, and more particularly to a decoupled architecture for artificial intelligence (AI) model management implemented in an information processing system.

BACKGROUND

In recent years, with the progress of artificial intelligence (AI) technology, application programs that employ AI models (such as, but not limited to, machine learning (ML) applications, deep learning (DL) applications, and data mining (DM) applications) have enabled significant development in many fields. However, as AI models become more complicated and need larger data sets, execution of such models requires more computing resources. Currently, due to limitations of computing capability and communication bandwidth of computing devices, a single computing device cannot typically satisfy the demands of a large-scale AI model. Therefore, efficient deployment and execution of AI models has become a focus of current research.

SUMMARY

Embodiments provide an artificial intelligence model framework with decoupled components for execution in an information processing system such as, but not limited to, an edge computing environment.

For example, in an illustrative embodiment, a system comprises a processing platform with at least one processor and at least one memory storing computer program instructions wherein, when the at least one processor executes the computer program instructions, the system further comprises the following components. A front-end component configured to: receive a selected first one of a set of artificial intelligence models having different initial model formats; translate the received artificial intelligence model from an initial model format into a second model format wherein the second model format corresponds to a model format supported by a selected one of a set of target devices upon which the artificial intelligence model is to be executed, wherein the set of target devices are deployed in a computing environment; and generate a computation graph corresponding to the translated artificial intelligence model. A scheduler component configured to: obtain binary representations of computations and dependency rules for the computations from the translated computation graph; and schedule the computations for execution on the selected one of the target devices based on the dependency rules and a selected parallelism algorithm. A back-end component configured to: generate code for executing the scheduled computations on the selected one of the target devices; and causing the code to be executed on the selected one of the target devices. The front-end component, the scheduler component and the back-end component are further configured to perform again at least a portion of the above operations corresponding to receipt of a selected second one of the set of artificial intelligence models or selection of another one of the set of target devices.

Advantageously, illustrative embodiments provide a decoupled artificial intelligence model management architecture comprising a front-end component, a scheduler component and a back-end component configured to enable an open and dynamic system which accepts any models from any formats to be deployed on any target devices and to dynamically change scheduling of parallelism, parameter movements and computation executions across the target devices.

DETAILED DESCRIPTION

Figure 1:
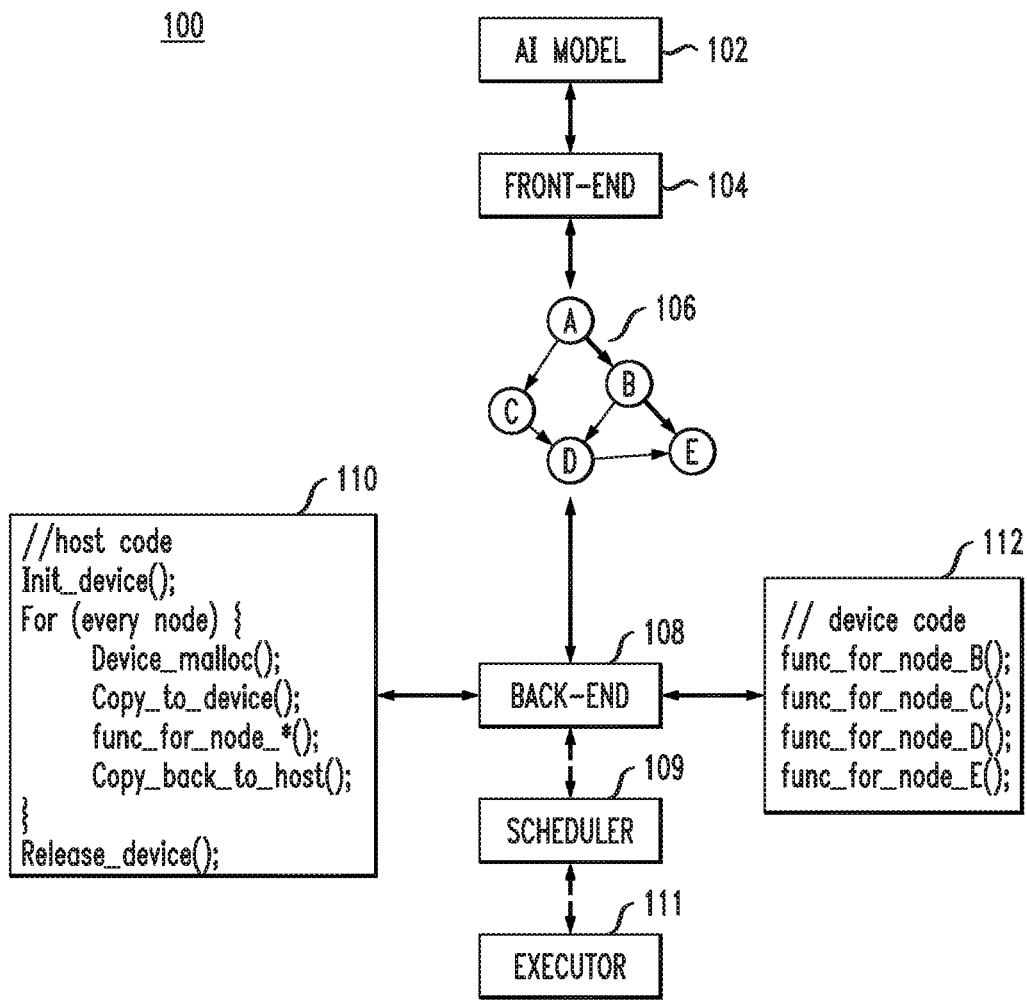
FIG. 1 illustrates a workflow for an artificial intelligence framework for runtime execution of an artificial intelligence model with which one or more illustrative embodiments can be implemented.

Illustrative embodiments will now be described herein in detail with reference to the accompanying drawings. Although the drawings and accompanying descriptions illustrate some embodiments, it is to be appreciated that alternative embodiments are not to be construed as limited by the embodiments illustrated herein. Furthermore, as used herein, the term "includes" and its variants are to be read as open-ended terms that mean "includes, but is not limited to." The term "based on" is to be read as "based at least in part on." The term "an embodiment" and "the embodiment" are to be read as "at least one example embodiment." The terms "first," "second," and the like may refer to different or the same objects. Other definitions, either explicit or implicit, may be included below.

When an AI model, such as a machine learning (ML) application, a deep learning (DL) application, and/or a data mining (DM) application, is utilized to process data, data is processed in parallel at least in an initial stage. In this manner, in a conventional approach, every computing device (machine) in a given network that executes the subject application, executes the entire AI model thereon to process a respective part of data. However, the growth of AI models has resulted in a single computing device being unable to execute the entire AI model independently. Thus, the concept of model parallelism is employed to execute a large, complicated AI model. For example, model parallelism is when the AI model is split (partitioned) among computing devices such that each computing device works on a part of the AI model.

In the context of model parallelism approaches, artificial (dummy) compiler techniques have been proposed for collecting resource requirements of each computing device, as well as model parallelism partition techniques based on an intermediate representation (IR) that divide the entire model into partitions which can then be computed in parallel by multiple computing devices which also exchange parameters between one another. Further, techniques have been proposed for scheduling the partitions into computing devices in a load-balanced manner based on resource requirements of the computation and other resources available on the devices. For example, techniques have been proposed for scheduling partitions for execution and balancing the computing and memory storage loads based on the resources available on the computing devices. Some of these proposed techniques are implementable for training of large models in graphic processing units (GPUs) distributed in multiple computing nodes in a cloud computing environment.

Furthermore, techniques have been proposed to provide a framework for implementing AI model parallelism in an edge computing environment. Edge computing is a distributed computing paradigm that typically comprises one or more edge servers running one or more application programs that interact with a plurality of heterogeneous computing devices (e.g., X86_64/ARM CPUs (central processing units), FPGAs (field programmable gate arrays), ASICs (application specific integrated circuits), programmable switches, etc.) which are normally computing resource-limited (e.g., limited in terms of processing and/or storage capacities). In addition, edge computing is an emerging technology developing together with emerging 5G (3GPP $5^{th}$ Generation) telecommunication network technology and equipped with many deep learning inference applications for autonomous driving, mobile mixed reality, drone pilot, smart home, Internet of Things (IoT) and virtual reality (VR) games, to name a few. Such applications typically need real-time responses or computing offload from servers, which cannot be adequately fulfilled by current cloud computing infrastructure. Thus, the emergence of edge computing is in response to the inability of centralized data centers to provide real-time or near-real-time compute capabilities to the vast (and growing) sources of decentralized data (so-called data "out in the wild"). Edge computing moves the computer workload closer to the consumer/data generator to reduce latency, bandwidth and overhead for the centralized data center and intermediate switches, gateways, and servers.

In accordance with illustrative embodiments, it is realized herein that a goal of standardization in deep learning and machine learning is that syntaxes and semantics of application programming interfaces (APIs) used in deep learning and machine learning programs created by different frameworks should be uniformly defined. This means that a model created and trained by a specific framework and targeting on a specific accelerator, e.g., a video classification model created in TensorFlow and targeting on a Nvidia GPU, could seamlessly be ported to another framework for deployment on another accelerator, e.g., converted to CoreML to be deployed in an iPhone to do the video inference with the iPhone SoC (System-on-Chip) as the accelerator.

Further, in accordance with illustrative embodiments, a front-end, a back-end and a computation scheduler in a deep learning framework are decoupled from each other and an open deep learning framework is constructed with building blocks from any infrastructure service providers. With an open front-end, the framework accepts any models pre-trained by any frameworks to serve as many clients as possible. With an open back-end, the framework supports accelerators from any vendors, and encourages more friendly competition among the vendors, so that the operational expenditure (OPEX) of the providers is lowered during their hardware purchasing. Further, with a customized, more flexible scheduler, the framework allows a heavy deep learning task to be tailored to the infrastructure configuration with higher performance, hence the capital expenditure (CAPEX) of the providers is lowered as well.

More particularly, illustrative embodiments provide a solution to build an open and dynamic inference deep learning framework on an edge computing platform, which accepts any models from any frameworks to be deployed on any target devices (e.g., CPU, GPU, proprietary accelerators such as FPGA, ASICs, etc.), and dynamically changes the scheduling of the parallelism, parameter movements and computation executions across the accelerators with open, well-developed building blocks. It is realized herein that in AI model technology, inference algorithms perform operations on data and continuously readjust probabilities based on new data to make predictions. Accordingly, after an AI model is initially trained, an AI inference model (e.g., inference program or inference application) is generated (from the trained model) that governs how to make predictions on new data. In one or more illustrative embodiments, the model that is partitioned and executed across multiple edge computing devices is an inference model/application (while model training is typically performed in a cloud computing environment). However, embodiments are not necessarily intended to be limited to AI inference models.

Runtime environments for provider-specific deep learning frameworks, for example, Tensorflow, PyTorch, or Keras, have a similar workflow which is illustrated in FIG. 1. More particularly, the main components of a deep learning framework runtime as illustrated in workflow 100 function as follows. An AI model 102, such as a Keras deep learning program, is presented to a framework compiler front-end 104 that compiles the program into an intermediate representation (IR) and corresponding computation graph 106 (e.g., static graph or dynamic graph). Each vertex (e.g., nodes A, B, C, D, E) in the computation graph 106 is a layer operator (e.g., convolution, activation, normalization, pooling, or softmax) defined by the deep learning framework, and each edge (arrow connecting nodes) defines the input/output dependency or producer/consumer relationship between two layers. Based on the computation graph 106, a framework compiler back-end 108 generates code for a scheduler 109 (host code 110) and kernel computations (device code 112).

More particularly, in one example, based on the vertexes in the computation graph 106, the framework compiler back-end 108 generates the implementations for all computation nodes (vertexes) by linking to third-party libraries such as cuDNN (Deep Neural Network) and cuBLAS (Basic Linear Algebra) for Nvidia GPU, Eigen library or BLAS for TensorFlow CPU, device drivers for proprietary accelerators such as TPU (Tensor Processing Unit), VTA (Versatile Tensor Accelerator) or ASICs, or directly generating the C function code for CPU or CUDA (Compute Unified Device Architecture) kernel functions. This implementation is JITed (Just-In-Time compiled) into binaries (i.e., binary representations of the vertexes of the computation graph) to be linked during the execution of the deep learning program. In a framework such as TVM (Tensor Virtual Machine), such computations can be compiled into a dynamically linked library to be deployed into computing devices in other computing nodes, with the computing devices being the same as the target when compiling the back-end binaries, i.e., cross-compilation. Based on the edges in the computation graph 106, the framework compiler back-end 108 generates scheduler code for the main CPU to schedule all kernel computations in order.

Figure 2:
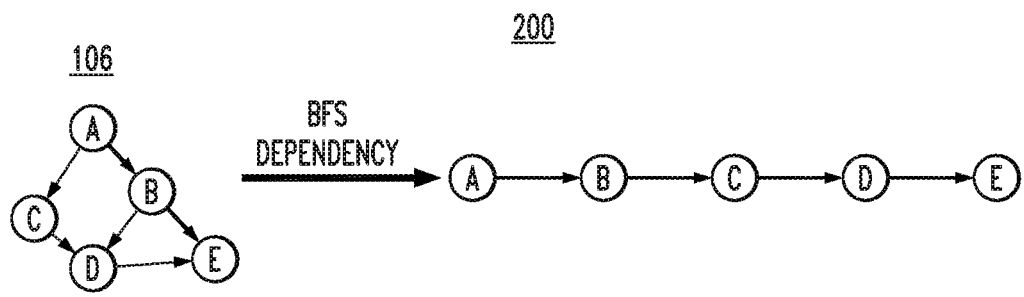
FIG. 2 illustrates an exemplary ordering for which a scheduler of an artificial intelligence framework calls kernel computations associated with a computation graph.

For example, in FIG. 2, an exemplary ordering 200 for the computation graph 106 is shown. The scheduler 109 then calls all kernel computations (functions) in this ordering 200 one by one, and for each of the kernel computations, the scheduler 109: (i) sets up the parameters of the call computation; (ii) if this computation is executed in an accelerator, copies the parameters from CPU memory onto the chip memory; (iii) causes execution of the kernel computation on the accelerator; and (iv) after computation, copies the results back from chip memory to the CPU main memory. Implementation details are slightly different in different provider-specific frameworks, for example, in TensorFlow, the input and output of a CUDA function are kept in the GPU to avoid parameter movement between the CPU and the GPU. But the principle is the same. After that, an executor 111 executes scheduler code 112 in the main CPU to execute the network.

From the description above, it is realized herein that only the front-end 104 is effectively connected to deep learning, as it will determine the network construction, what computations are used in each layer, etc. from the user program (AI model 102). But once the front-end 104 has compiled the program into a deep learning IR and computation graph 106, tasks of the back-end 108, the scheduler 109 and the executor 111 effectively have nothing to do with the deep learning domain-specific knowledge, e.g., how the back-end 108 generates the code to implement a mathematic computation for a target device, how the scheduler 109 decides which computation will be called first and which one will be next, how to set up the parameters for these computations, and how to schedule different computations into different computing devices. None of these tasks are specific to deep learning.

For a deep learning network computation model in inference, e.g., a simple deep neural network (DNN), the feed-forward computation of layer l+1 can be represented as the following formula:

$$O_{l+1} = \sigma(M_{l+1} \times O_l + b_{l+1})$$

where:
$O_{l+1}$ is the output of layer l+1 and $O_l$ is the output of layer l;
σ is the activation function defined in layer l+1; and
$M_{l+1}$ and $b_{l+1}$ are the parameters for layer l+1.

An inference has only feed-forward computing (without back-propagation), as such, this is the only computation for each layer. Also, since an inference uses a pre-trained network with parameters ($M_{l+1}$ and $b_{l+1}$) fixed, the parameters ($M_{l+1}$ and $b_{l+1}$) do not change during inference and the only dynamic data flowing between two layers l+1 and l is $O_l$, which is normally much smaller than the parameters $M_{l+1}$ and $b_{l+1}$ in size.

An edge inference application in a 5G network may serve one user equipment (UE) or a plurality of UEs at the same time, and such an application may have one or multiple process instances, hosted in a single or multiple edge nodes.

Figure 3:
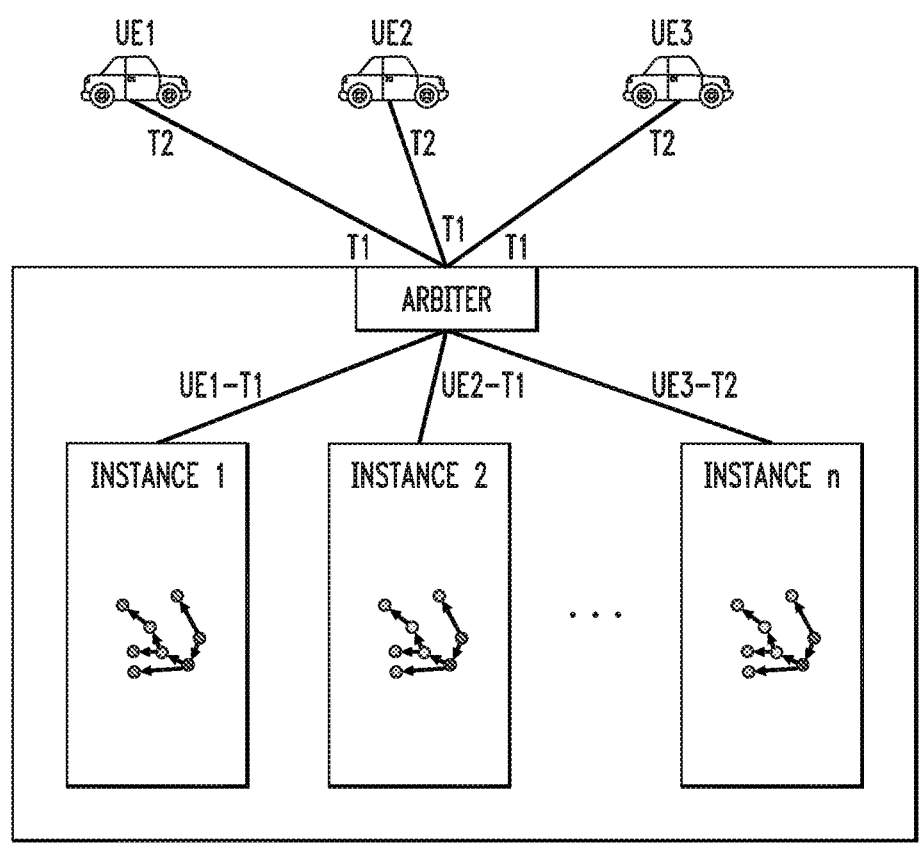
FIG. 3 illustrates an edge inference application model for a plurality of mobile user equipment of a telecommunications network with which one or more illustrative embodiments can be implemented.

For example, in scenario 300 of FIG. 3, it is assumed that there are n instances of an inference application running in a single edge node to serve a plurality of 5G UEs, i.e., UE1, UE2 and UE3. It is further assumed that data $T_{11}, T_{12}, \ldots$ from UE1 in $T_1, T_2, \ldots, T_{21}, T_{22}, \ldots$ from UE2 in $T_1, T_2, \ldots$ and $T_{31}, T_{32}, \ldots$ from UE3 in $T_1, T_2, \ldots$ is sent through an arbiter to the inference application as input in a streamed manner. The inference application continuously computes the network based on this streamed input and outputs inference results (not expressly shown) $R_{11}$, $R_{12}, \ldots$ for $T_{11}, T_{12}, \ldots, R_{21}, R_{22}, \ldots$ for $T_{21}, T_{22}, \ldots$ and $R_{31}, R_{32}, \ldots$ for $T_{31}, T_{32}, \ldots$, with each $R_{ij}$ only depending on $T_{ij}$ and completely irrelevant to other inputs and outputs. The parameters $M_{l+1}$ and $b_{l+1}$ can be reused for all input samples. However, the dynamic data $O_l$ between two layers l+1 and l changes in inferences for different input $T_{ij}$.

Most current deep learning frameworks are originally designed for training a model in a cloud computing environment such as, e.g., TensorFlow, PyTorch, Keras, and MxNET. Some frameworks such as, e.g., TVM, ONNX Runtime, and OpenVINO are designed for inference, however, they are designed for a one-shot execution rather than executing inference on a continuously streamed input. In addition, both types of model frameworks (training and inference) are implemented whereby front-end, back-end, and scheduler are mixed and closely tied together, even though only the front-end is connected to the deep learning network and algorithm as realized herein. Such an implementation policy results in problems, examples of which will now be described.

As both the front-end (APIs and model formats) and back-end (supported computing devices) of the framework are closed to programmers, users of such frameworks have to switch between different frameworks. For example, users have to train a model in TensorFlow in the cloud with GPU as accelerators, then convert this pre-trained model into CoreML and deploy it into an iPhone for inference. However, since there are a large number of neural network models and many edge or IoT devices, such a process is very time-consuming and tedious.

Further, current frameworks typically use data parallelism to accelerate the training of a model. The reason why data parallelism works is that, during training, the entire dataset is split into mini-batches and each mini-batch is trained in a different computing node and the gradients are then aggregated. For a single computing node, the computations for each sample are actually executed one by one, without any parallel computing among them. However, for inference in an edge computing environment, each inference is executed based on a single sample from the streamed input, with each sample being irrelevant to (independent of) the other. Accordingly, there is typically no data parallelism in inference execution.

Also, in current framework implementations, with the front-end, back-end and scheduler so closely tied, it is realized herein that it is difficult for the user to customize the scheduler to organize the computations more efficiently, for example, to use model parallelism or pipeline parallelism, rather than data parallelism.

Furthermore, in current implementations, the framework usually demands that a target device (e.g., CPU, GPU, or other accelerators) be specified for the computing, otherwise the framework will automatically choose one for the user. Once a target device is specified, the framework executes all computations in this device, even if some computations are not suitable for execution in this type of device. For example, a padding computation copies some pixels of an image from one set of memory locations to another set of memory locations. Such a basic computation is more efficient if it is executed in the CPU main memory. However, if a GPU is automatically specified, the current framework still executes the padding on the GPU even though it is a waste of the accelerated computing capabilities of the GPU.

As described above, the inference application on an edge computing environment will typically execute the network computations on a streamed input. This means that the parameters ($M_{l+1}$ and $b_{l+1}$ in the above formula) may be kept in the accelerator device memory for performance optimization across the inferences for different input samples. However, in current framework implementations, for each computation, the scheduler copies the fixed parameters from the CPU to the GPU before the computation in the devices and copies computing results from the GPU back to the CPU after the computation. Alternatively, as per the implementation in TensorFlow, the input and output of a CUDA function are typically always kept in the GPU to avoid parameter movement between the CPU and the GPU. However, both implementations can be inefficient. For the first implementation (i.e., copying back and forth between the CPU and the GPU), parameter movement takes a long time. For example, in a worst case scenario, the computing result may need to be copied back from the GPU to the CPU and then immediately copied back from the CPU to the GPU as the next computation needs it as input. In the second implementation (i.e., TensorFlow), if some parameters are not used for a relatively long period of time, it may waste critical GPU memory. In addition, in some cases, a model may be too large to be loaded into a single GPU or a single computing node.

Yet further, current deep learning frameworks are oriented to very high-level programming languages, e.g., Python or JavaScript, in order to render the framework's internal implementation details transparent to deep learning programmers. Thus, a programmer only needs to write the deep learning program in such a high-level language to define the computations of each layer inside the neural network and the framework essentially handles everything else automatically. Such an implementation is advantageous for fast-prototyping but very limited for actual production.

Illustrative embodiments overcome the above and other drawbacks of current AI model frameworks. It is realized herein, as mentioned above, that only the front-end is connected to deep learning. That is, the back-end and the scheduler adopt common practices similar to other (non-AI) applications. For example, the back-end only needs to generate code for computations and compile the code against the target devices, as long as the APIs specified in the front-end are well-defined in syntaxes and semantics. By way of further example, the scheduler only needs to schedule the computing tasks dynamically across different computing devices, as long as it complies with the dependency rules defined in the computation graph in the front-end. Still further, it is realized herein that the parameters ($M_{l+1}$ and $b_{l+1}$) can be reused across different inferences and therefore can be reused for all input samples. This means that the parameters can be kept in the memory as long as possible and shared between computations for different input samples.

Based on these and other realizations described herein, illustrative embodiments provide an improved AI model framework whereby components are advantageously decoupled from one another and thus provide improved AI model management as will be explained in further detail herein.

Figure 4:
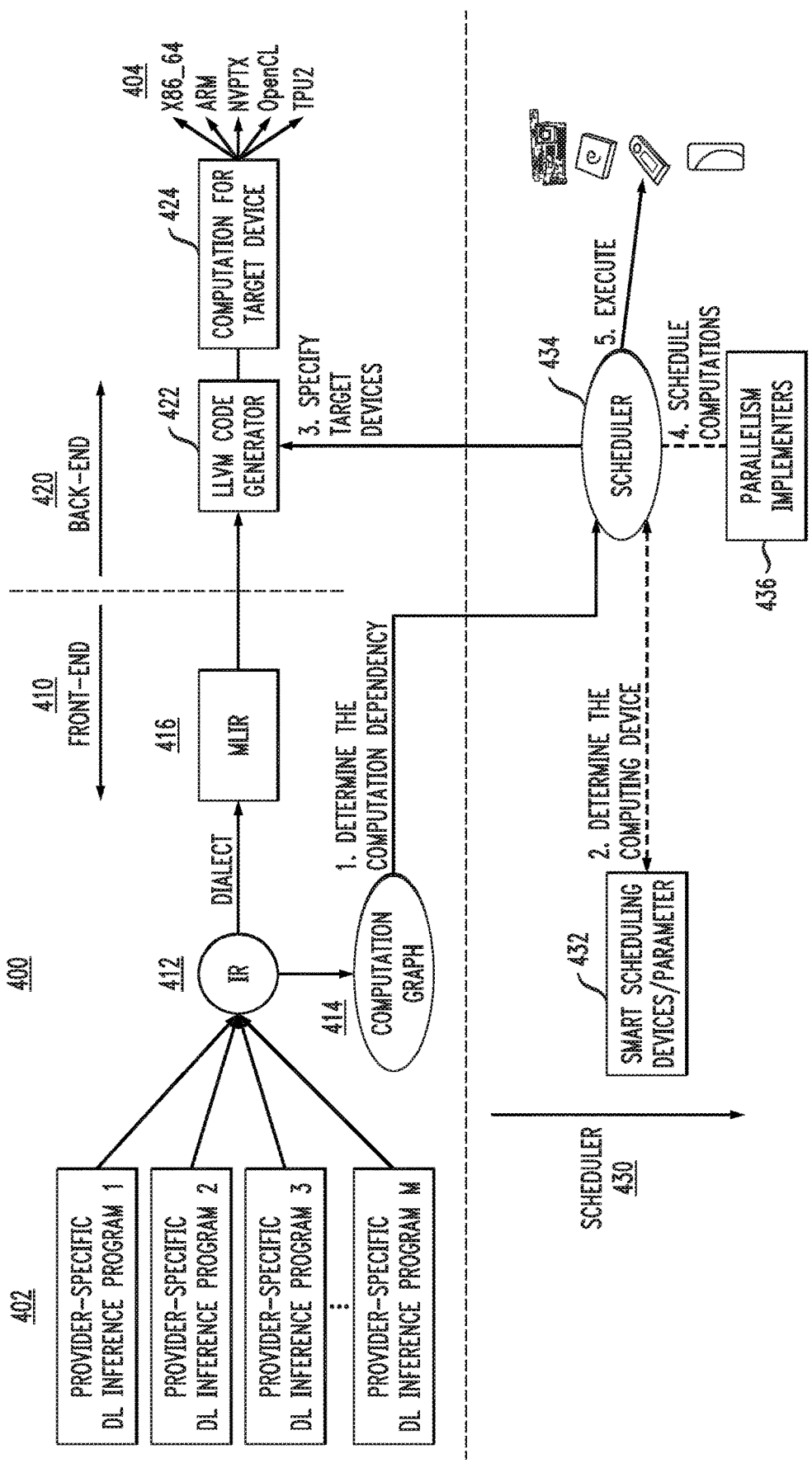
FIG. 4 illustrates an information processing system for a decoupled architecture for runtime execution of an artificial intelligence model according to an illustrative embodiment.

FIG. 4 illustrates a decoupled architecture 400 for an AI model framework according to an illustrative embodiment. As will be explained in detail, architecture 400 provides for an application-in place inference runtime execution environment, a dynamically pluggable and unpluggable scheduler architecture, smart scheduling computations among heterogeneous computing (target) devices, and smart scheduling parameters among computations.

The application-in place inference runtime of architecture 400 is comprised of three decoupled components: a front-end 410, a back-end 420 and a scheduler 430.

In the illustrative embodiment of FIG. 4, front-end 410 implements an Open Neural Network Exchange (ONNX) which is an open source AI system configured to accept any AI models from any frameworks (AI models represented as set 402 of Provider-specific DL Inference Programs 1, 2, 3, . . . M, e.g., Tensorflow, PyTorch, Keras, etc.). ONNX defines a common set of computation application programming interfaces (APIs), which are the building blocks of machine learning and deep learning models, and a common file format to enable AI developers to use models with a variety of frameworks, tools, runtimes, and compilers. ONNX functions as a translator with its input mechanism configured to translate a given AI model 402 and computation APIs defined in a first framework into its internal model format and APIs, and its output mechanism configured to translate its internal model format and APIs to the model and the computation APIs defined in a second framework. Hence, a model defined in the first framework is converted and used in the second framework. The ONNX-based front-end 410 thus generates an intermediate representation (IR) 412 and corresponding computation graph 414. It is to be appreciated that embodiments are not limited to the ONNX AI system and that other AI systems may be used for front-end 410.

Since ONNX only functions as a front-end, architecture 400 also implements a Multi-Level Intermediate Representation with a Low Level Virtual Machine (MLIR-LLVM) platform as back-end 420. MLIR 416 is a representation format and a library of compiler utilities that functionally resides between the model representation (IR 412) and low-level compilers/executors that generate hardware-specific code (LLVM Code Generator 422). MLIR is open by defining other IRs in other deep learning frameworks as dialects. By implementing the pre-defined functionalities in MLIR 416, a new IR can be integrated into MLIR 416 and then can leverage the tools and libraries generated by MLIR 416. Back-end platforms other than MLIR-LLVM may be used in alternative embodiments.

MLIR 416 is integrated into the LLVM project which is a collection of modular and reusable compiler and toolchain technologies, with a platform to generate code for popular target devices (represented as set 404) such as, but not limited to, Intel X86_64, ARM, Nvidia GPU, AMD GPU, NVPTX, OpenCL, TPU2, etc. A user can also customize back-end 420 to generate code for proprietary devices such as FPGA, ASICs, etc.

With ONNX as the front-end 410, any models can be accepted from any frameworks. With MLIR 416 as an intermediate stage coupled to LLVM Code Generator 422 of the back-end 420, ONNX can be transformed into MLIR, and with the LLVM, code can be generated for any target devices from MLIR. As such, according to illustrative embodiments, architecture 400 advantageously accepts any models from any frameworks and deploy them into any devices.

Architecture 400 also deploys a dynamically pluggable and unpluggable scheduler system 430. To implement decoupled (functionally separate from front-end 410 and back-end 420) scheduling functionalities in the illustrative framework of FIG. 4, scheduler system 430 receives computation graph 414 from the ONNX-based front-end 410 to define the dependency rules between different computations, and the compiled binaries of all computations for the target devices based on the syntax and semantics of the computation definitions in the MLIR 416.

In one non-limiting example, computation graph 414 is generated from a SqueezeNet model exported from PyTorch to the front-end 410 with names and argument shapes defined for each computation. The compiled binaries of all computations based on the target devices (devices/parameters 432) are retrieved from the inference runtime. With the computation and binaries available, architecture 400 implements a scheduler 434 which can be plugged to and unplugged from the framework in runtime, with each different scheduler implementing different computing parallelism, i.e., parallelism implementers 436. Parallelism implementers 436 may be configured with parallelism techniques including, but are not limited to, model parallelism, pipeline parallelism, etc. Thus, as shown, architecture 400 determines the computation dependencies (step 1), determines the computing devices (step 2), specifies the target devices (step 3), schedules the computations (step 4), and executes the computations (step 5).

Based on the target device (i.e., one of computing devices 404) specified by the user, different selectable scheduling policies can be employed to execute the computations (424). For example:
(1) if the target device is a CPU, there is no accelerator on the node and thus all computations will be scheduled on the CPU.
(2) If the target device is a GPU, ONNX-defined computation APIs are split into two categories:
  (i) For APIs which are suitable to be executed on a GPU, during the back-end code generation phase, link it to cuDNN/cuBLAS or CUDA API, or if such APIs are not available, generate the CUDA function for it, so that these computations will be executed in a GPU.
  (ii) For APIs which are not suitable to be executed on a GPU, during the back-end code generation phase, link it to General Matrix-Matrix (GEMM)/Eigen libraries for CPU, or if such API is not available, generate the CPU function for it, so that these computations will be executed in a CPU.
(3) If the target device is a proprietary target device such as a FPGA or an ASIC, during the back-end code generation phase, link the computations to the device library provided by the vendor if they are implemented by the device, else generate the CPU function for it.

Figure 5:
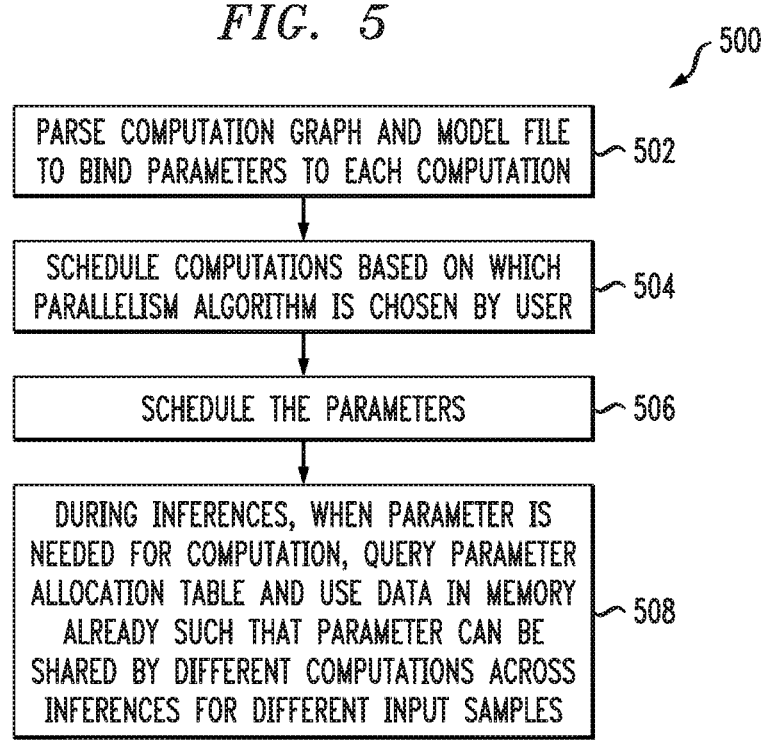
FIG. 5 illustrates a methodology associated with a decoupled architecture for runtime execution of an artificial intelligence model according to an illustrative embodiment.

In one example workflow, as shown in methodology 500 of FIG. 5, scheduler system 430 is implemented as follows:
(1) Parse the computation graph and the model file to bind the parameters to each computation (step 502).
(2) Schedule the computations based on which parallelism algorithm is chosen by the user (step 504):
  If default data parallelism is chosen, schedule all computations into a local computing node based on the target device specified by the user, CPU or CPU+ specified accelerator.
  If pipeline parallelism is chosen, schedule all computations into a local computing node with all CPU cores and/or all accelerators.
  If model parallelism is chosen, schedule all computations into the computing nodes in the cluster with all CPU cores and/or all accelerators.
(3) Schedule the parameters (step 506):
  If a computation has been scheduled into a CPU, allocate main memory for the input parameters and computing results for this computation and copy the parameters for this computation into CPU main memory.
  If a computation has been scheduled into an accelerator, allocate device memory for the input parameters and computing results for this computation and copy the parameters for this computation into device memory.
(4) During the inferences, when a parameter (input or output) is needed for computation, query the parameter allocation table first, if it has already registered in the main memory or device memory. If yes, use the data in memory already, so that the parameters can be shared by different computations across the inferences for different input samples (step 508).

Accordingly, as explained above, illustrative embodiments provide many advantages, for example, they present an open and dynamic inference deep learning framework for an edge computing environment.

The framework is open in that:
 the front-end of the framework can accept all models from all frameworks;
 the back-end can generate code for all target devices (with a customized back-end for proprietary devices if needed); and
 the scheduler is open also as it can be customized or chosen by the user.

The framework is dynamic in that:
 Once the hardware configuration of an edge node has changed, the framework back-end can generate the code for the new devices just in time and just in place;
and
 The scheduler can be configured to choose different parallelism during runtime.

Illustrative embodiments provide an architecture different from current frameworks in that:
(i) With such a decoupled architecture, the user only needs to provide the model file for which framework this model is pre-trained, then the architecture can deploy it onto any platform on any device.
(ii) Pipeline parallelism and model parallelism is provided along with the decoupled architecture to work on a single edge node or across multiple edge nodes.
(iii) A dynamically pluggable and unpluggable scheduler architecture is provided in the decoupled architecture such that the user can dynamically change the default parallelism algorithm used in the architecture.
(iv) All computations are intelligently scheduled across different computing devices based on the characteristics of the computation for performance optimization.
(v) All model pre-trained parameters are intelligently scheduled based on the computation scheduling so that these parameters can be shared between different computations and inferences for different input samples to save the cost of parameter movement and at the same time to save critical device memory.

Such a decoupled architecture greatly benefits infrastructure service providers:
(i) With an open front-end, the architecture accepts any models pre-trained by any frameworks to serve as many clients as possible.
(ii) With an open back-end, the architecture supports more accelerators from more vendors and encourages more friendly competition among the vendors so that the OPEX of the providers can be lowered during their hardware purchasing.

(iii) With an open scheduler, the architecture allows a heavy deep learning task to be tailored to the infrastructure configuration with higher performance, hence the CAPEX of the providers is also lowered.

Figure 6:
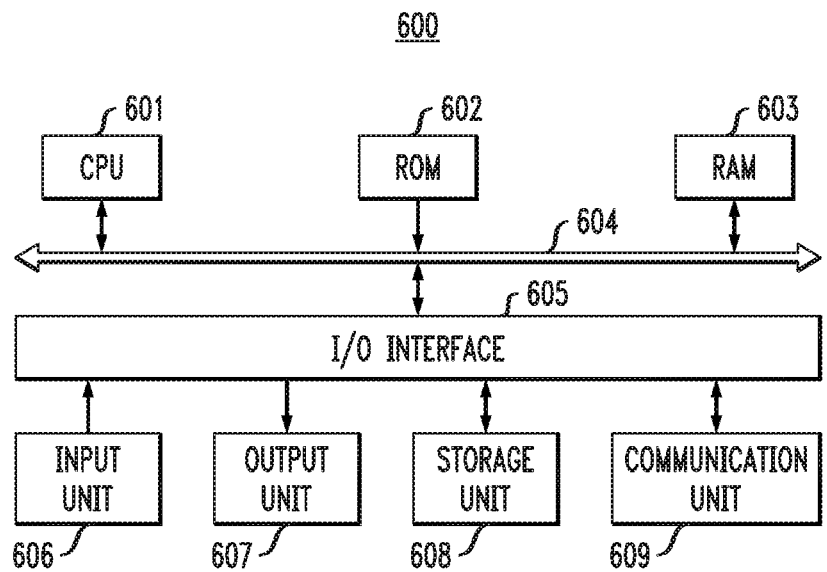
FIG. 6 illustrates a processing platform used to implement an information processing system for a decoupled architecture for runtime execution of an artificial intelligence model according to an illustrative embodiment.

FIG. 6 illustrates a block diagram of an example processing device or, more generally, an information processing system 600 that can be used to implement illustrative embodiments. For example, one or more components in FIGS. 1-4 can comprise a processing configuration such as that shown in FIG. 6 to perform steps described above in the context of FIG. 5. Note that while the components of system 600 are shown in FIG. 6 as being singular components operatively coupled in a local manner, it is to be appreciated that in alternative embodiments each component shown (CPU, ROM, RAM, and so on) can be implemented in a distributed computing infrastructure where some or all components are remotely distributed from one another and executed on separate processing devices. In further alternative embodiments, system 600 can include multiple processing devices, each of which comprise the components shown in FIG. 6.

As shown, the system 600 includes a central processing unit (CPU) 601 which performs various appropriate acts and processing, based on a computer program instruction stored in a read-only memory (ROM) 602 or a computer program instruction loaded from a storage unit 608 to a random access memory (RAM) 603. The RAM 603 stores therein various programs and data required for operations of the system 600. The CPU 601, the ROM 602 and the RAM 603 are connected via a bus 604 with one another. An input/output (I/O) interface 605 is also connected to the bus 604.

The following components in the system 600 are connected to the I/O interface 605, comprising: an input unit 606 such as a keyboard, a mouse and the like; an output unit 607 including various kinds of displays and a loudspeaker, etc.; a storage unit 608 including a magnetic disk, an optical disk, and etc.; a communication unit 609 including a network card, a modem, and a wireless communication transceiver, etc. The communication unit 609 allows the system 600 to exchange information/data with other devices through a computer network such as the Internet and/or various kinds of telecommunications networks.

Various processes and processing described above may be executed by the processing unit 601. For example, in some embodiments, methodologies described herein may be implemented as a computer software program that is tangibly included in a machine readable medium, e.g., the storage unit 608. In some embodiments, part or all of the computer programs may be loaded and/or mounted onto the system 600 via ROM 602 and/or communication unit 609. When the computer program is loaded to the RAM 603 and executed by the CPU 601, one or more steps of the methodologies as described above may be executed.

Illustrative embodiments may be a method, a device, a system, and/or a computer program product. The computer program product may include a computer readable storage medium having computer readable program instructions thereon for causing a processor to carry out aspects of illustrative embodiments.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of illustrative embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Various technical aspects are described herein with reference to flowchart illustrations and/or block diagrams of methods, device (systems), and computer program products according to illustrative embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other devices to cause a series of operational steps to be performed on the computer, other programmable devices or other devices to produce a computer implemented process, such that the instructions which are executed on the computer, other programmable devices, or other devices implement the functions/acts specified in the flowchart and/or block diagram block or blocks.

The flowchart and block diagrams illustrate architecture, functionality, and operation of possible implementations of systems, methods and computer program products according to various embodiments. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
  a processing platform with at least one processor and at least one memory storing computer program instructions wherein, when the at least one processor executes the computer program instructions, the system further comprises:
  a front-end component configured to: receive a selected first one of a set of artificial intelligence models having different initial model formats; translate the selected first artificial intelligence model from an initial model format into a second model format wherein the second model format corresponds to a model format supported by a selected one of a set of target devices upon which the selected first artificial intelligence model is to be executed, wherein the set of target devices are deployed in a computing environment; and generate a computation graph corresponding to the translated artificial intelligence model, wherein the computation graph is generated by compiling the selected first artificial intelligence model to be executed into an intermediate representation, and wherein the computation graph comprises two or more nodes each representing a layer operator defined by the selected first artificial intelligence model and one or more edges defining a dependency relationship between the two or more nodes;
  a scheduler component configured to: select a scheduler of a plurality of schedulers based on a selected parallelism algorithm, wherein each of the plurality of schedulers implements a different parallelism algorithm; use the selected scheduler to obtain binary representations of computations based on the two or more nodes of the translated computation graph and dependency rules for the computations based on the one or more edges of the translated computation graph; schedule the computations for execution on the selected one of the target devices based on the dependency rules, one or more characteristics of the computations and the selected parallelism algorithm; and schedule parameters associated with the second model format, the scheduling comprising determining whether the parameters associated with the second model format are registered and sharing the parameters associated with the second model format among a subset of the computations that are scheduled for execution on the selected one of the target devices; and
  a back-end component configured to: generate code for executing the scheduled computations based on the second model format of the selected one of the target devices, the generating including generating implementations for the two or more nodes of the computation graph and just-in-time computing the implementations into binary representations of the two or more nodes of the computation graph; and causing the code to be executed on the selected one of the target devices in order to execute at least part of the selected first artificial intelligence model on the selected one of the target devices;
  wherein the front-end component, the scheduler component and the back-end component are functionally separate from each other and are further configured to re-perform at least a portion of the above operations corresponding to receipt of a selected second one of the set of artificial intelligence models, or a detected change in at least one of the selected one of the set of target devices and the selected parallelism algorithm.

2. The system of claim 1, wherein the computing environment in which the set of target devices are deployed comprises an edge computing environment.

3. The system of claim 1, wherein the selected first artificial intelligence model comprises an inference program.

4. The system of claim 1, wherein the selected parallelism algorithm comprises a model parallelism algorithm or a pipeline parallelism algorithm.

5. The system of claim 1, wherein the front-end component is further configured to generate an intermediate representation corresponding to the translated artificial intelligence model.

6. The system of claim 1, wherein, when the selected one of the set of target devices is a central processing unit, the back-end component is further configured to generate code for execution of all computations on the central processing unit.

7. The system of claim 1, wherein, when the selected one of the set of target devices is a graphical processing unit, the back-end component is further configured to: generate code for execution on the graphical processing unit for computations that are appropriate for execution on the graphical processing unit; and generate code for execution on a central processing unit for computations that are not appropriate for execution on the graphical processing unit.

8. The system of claim 1, wherein, when the selected one of the set of target devices is a proprietary target device, the back-end component is further configured to:
generate code for execution of computations on the proprietary target device when available for the proprietary target device; and generate code for execution of computations on a central processing unit when not available for the proprietary target device.

9. The system of claim 1, wherein the scheduler component is further configured to parse the computation graph.

10. The system of claim 1, wherein the scheduler component is further configured to bind the parameters associated with the second model format to each computation.

11. The system of claim 10, wherein a given parameter is shared between two or more computations.

12. A method, comprising:
receiving, in a front-end component, a selected first one of a set of artificial intelligence models having different initial model formats;
translating, in the front-end component, the selected first artificial intelligence model from an initial model format into a second model format wherein the second model format corresponds to a model format supported by a selected one of a set of target devices upon which the selected first artificial intelligence model is to be executed, wherein the set of target devices are deployed in a computing environment;
generating, in the front-end component, a computation graph corresponding to the translated artificial intelligence model, wherein the computation graph is generated by compiling the selected first artificial intelligence model to be executed into an intermediate representation, and wherein the computation graph comprises two or more nodes each representing a layer operator defined by the selected first artificial intelligence model and one or more edges defining a dependency relationship between the two or more nodes;
selecting, with a scheduler component, a scheduler of a plurality of schedulers based on a selected parallelism algorithm, wherein each of the plurality of schedulers implements a different parallelism algorithm;
using the selected scheduler to obtain, in the scheduler component, binary representations of computations based on the two or more nodes of the translated computation graph and dependency rules for the computations based on the one or more edges of the translated computation graph;
scheduling, by the scheduler component, the computations for execution on the selected one of the target devices based on the dependency rules, one or more characteristics of the computations and a selected parallelism algorithm;
scheduling parameters associated with the second model format, the scheduling comprising determining whether the parameters associated with the second model format are registered and sharing the parameters associated with the second model format among a subset of the computations that are scheduled for execution on the selected one of the target devices;
generating, in a back-end component, code for executing the scheduled computations based on the second model format of the selected one of the target devices, the generating including generating implementations for the two or more nodes of the computation graph and just-in-time computing the implementations into binary representations of the two or more nodes of the computation graph;
causing, by the back-end component, the code to be executed on the selected one of the target devices in order to execute at least part of the selected first artificial intelligence model on the selected one of the target devices; and
re-performing at least a portion of the above steps corresponding to receipt of a selected second one of the set of artificial intelligence models or a detected change in at least one of the selected one of the set of target devices and the selected parallelism algorithm;
wherein the front-end component, the scheduler component and the back-end component are functionally separate from each other and are implemented on a processing platform with at least one processor and at least one memory storing computer program instructions wherein, when the at least one processor executes the computer program instructions, the above steps are performed.

13. The method of claim 12, wherein the computing environment in which the set of target devices are deployed comprises an edge computing environment.

14. The method of claim 12, wherein the selected first artificial intelligence model comprises an inference program.

15. The method of claim 12, wherein the selected parallelism algorithm comprises a model parallelism algorithm or a pipeline parallelism algorithm.

16. The method of claim 12, further comprising generating, in the front-end component, an intermediate representation corresponding to the translated artificial intelligence model.

17. A computer program product stored on a non-transitory computer-readable medium and comprising machine executable instructions, the machine executable instructions, when executed, causing a processing device to:
receive, in a front-end component, a selected first one of a set of artificial intelligence models having different initial model formats;
translate, in the front-end component, the selected first artificial intelligence model from an initial model format into a second model format wherein the second model format corresponds to a model format supported by a selected one of a set of target devices upon which the selected first artificial intelligence model is to be executed, wherein the set of target devices are deployed in a computing environment;
generate, in the front-end component, a computation graph corresponding to the translated artificial intelligence model, wherein the computation graph is generated by compiling the selected first artificial intelligence model to be executed into an intermediate representation, and wherein the computation graph comprises two or more nodes each representing a layer operator defined by the selected first artificial intelligence model and one or more edges defining a dependency relationship between the two or more nodes;

select, with a scheduler component, a scheduler of a plurality of schedulers based on a selected parallelism algorithm, wherein each of the plurality of schedulers implements a different parallelism algorithm;

use the selected scheduler to obtain, in the scheduler component, binary representations of computations based on the two or more nodes of the translated computation graph and dependency rules for the computations based on the one or more edges of the translated computation graph;

schedule, by the scheduler component, the computations for execution on the selected one of the target devices based on the dependency rules and a selected parallelism algorithm;

schedule parameters associated with the second model format, the scheduling comprising determining whether the parameters associated with the second model format are registered and sharing the parameters associated with the second model format among a subset of the computations that are scheduled for execution on the selected one of the target devices;

generate, in a back-end component, code for executing the scheduled computations based on the second model format of the selected one of the target devices, the generating including generating implementations for the two or more nodes of the computation graph and just-in-time computing the implementations into binary representations of the two or more nodes of the computation graph;

cause, by the back-end component, the code to be executed on the selected one of the target devices in order to execute at least part of the selected first artificial intelligence model on the selected one of the target devices; and re-perform at least a portion of the above steps corresponding to receipt of a selected second one of the set of artificial intelligence models or a detected change in at least one of the selected one of the set of target devices and the selected parallelism algorithm;

wherein the front-end component, the scheduler component and the back-end component are functionally separate from each other.

18. The computer program product of claim 17, wherein the computing environment in which the set of target devices are deployed comprises an edge computing environment.

19. The computer program product of claim 17, wherein the selected first artificial intelligence model comprises an inference program.

20. The computer program product of claim 17, wherein the selected parallelism algorithm comprises a model parallelism algorithm or a pipeline parallelism algorithm.

* * * * *